US006555406B1

(12) United States Patent
Leung et al.

(10) Patent No.: US 6,555,406 B1
(45) Date of Patent: Apr. 29, 2003

(54) FABRICATION OF PHOTONIC BAND GAP MATERIALS USING MICROTRANSFER MOLDED TEMPLATES

(75) Inventors: Wai Leung, Ames, IA (US); Kristen Constant, Ames, IA (US); Kai-Ming Ho, Ames, IA (US); Mihail Sigalas, Santa Clara, CA (US); Henry Kang, Miami, FL (US); Chang Hwan Kim, Ames, IA (US); David Cann, Ames, IA (US); Jae Hwang Lee, Ames, IA (US)

(73) Assignee: Iowa State University Research Foundation, Ames, IA (US)

( * ) Notice: Subject to any disclaimer, the term of this patent is extended or adjusted under 35 U.S.C. 154(b) by 0 days.

(21) Appl. No.: 10/081,729

(22) Filed: Feb. 22, 2002

Related U.S. Application Data

(60) Provisional application No. 60/271,345, filed on Feb. 23, 2001.

(51) Int. Cl.[7] .............................................. H01L 21/00
(52) U.S. Cl. ........................................ 438/22; 438/42
(58) Field of Search .............................. 438/22, 25, 26, 438/31, 35, 36, 42, 51, 55, 64

(56) References Cited

U.S. PATENT DOCUMENTS 6,469,682 B1 * 10/2002 de Maagt et al.

OTHER PUBLICATIONS

Yablonovitch, E., "Photonic Band–Gap Structures", J. Opt. Soc. Am. B, vol. 10 (2), p. 283–295, Feb. 1993.
Ozbay, E., "Layer–by Layer photonic crystals from microwave to far–infrared frequencies", J. Opt. Soc. Am. B, vol. 13 (9), p. 1945–1955, Sep. 1996.
Wanke, M.C., Stuke, M., "Laser Rapid Prototyping of Photonic–Band–Gap Microstructures", Science Paper (1996).
X.M Zhao, Y. Xia, G.M Whitesides, "Fabrication of Three–Dimensional Micro–Structures: Microtransfer Molding", Advanced Materials Communications 8 (10), p. 837–840, 1996.
A. Kumar, H.A. Biebuyck, G.M. Whitesides, "Patterning Self–Assembled Monolayers: Applications in Materials Science", Langmuir, 10, p. 1498–1511, 1994.
P. Yang, T. Deng, D. Zhao, P. Feng, D. Pine, B.R. Chmelka, G.M. Whitesides, G.D. Stucky, "Hierarchically Ordered Oxides", Science V 282, p. 2244–2246, Dec. 18, 1998.
A. Feigel, Z. Kotler, B. Sfez, A. Arsh, M. Klebanov, V. Lyubin, "Chalcogenide glass–based three–dimensional photonic crystals", American Institute of Physics, Applied Physics Letters, vol. 77 No. 20, p. 3221–3223, 0003–6951/2000/77(20)/3221/3, 2000.
M. Mützel, S. Tandler, D. Haubrich, D. Meschede, K. Peithmann, M. Flaspöhler, K. Buse, "Atom Lithography with a Holographic Light Mask", The American Physical Society, Physical Review Letters, vol. 88, No. 8, Feb. 25, 2002.
Brian T. Holland, Christopher F. Blanford, Andreas Stein, "Synthesis of Macroporous Minerals with Highly Ordered Three–Dimensional Arrays of Spheroidal Voids", Science, vol. 281, p. 38–40, Jul. 24, 1998.

\* cited by examiner

Primary Examiner—David Nelms
Assistant Examiner—Phuc T. Dang
(74) Attorney, Agent, or Firm—Leydig, Voit & Mayer, Ltd.

(57) ABSTRACT

A method of manufacturing photonic band gap structures operable in the optical spectrum has been presented. The method comprises the steps of creating a patterned template for an elastomeric mold, fabricating an elastomeric mold from poly-dimethylsiloxane (PDMS) or other suitable polymer, filling the elastomeric mold with a second polymer such as epoxy or other suitable polymer, stamping the second polymer by making contact with a substrate or multilayer structure, removing the elastomeric mold, infiltrating the multilayer structure with ceramic or metal, and heating the multilayer structure to remove the second polymer to form a photonic band gap structure.

18 Claims, 17 Drawing Sheets

80

90

110

110

22  22

22  22

22  22

22  22

22  22

22  22

22  22

22  22

FABRICATION OF PHOTONIC BAND GAP MATERIALS USING MICROTRANSFER MOLDED TEMPLATES

CROSS-REFERENCE TO RELATED PATENT APPLICATIONS

This patent application claims the benefit of U.S. provisional patent application No. 60/271,345, filed Feb. 23, 2001.

STATEMENT REGARDING FEDERALLY SPONSORED RESEARCH OR DEVELOPMENT

This invention was made in part with Government support under DOE Contract No. W-7405-Eng-82 and DOC Contract No. ITA87-02. The government may have certain rights in this invention.

FIELD OF THE INVENTION

The present invention relates generally to photonic band gap devices and methods of manufacturing same, and more particularly to a photonic band gap structure suitable for filtering in the optical wavelength region and a method of manufacturing same.

BACKGROUND OF THE INVENTION

Photonic band gap (PBG) structures are periodic dielectric or metallic structures that exhibit frequency regions in which electromagnetic waves cannot propagate. The interest in PBGs arises from the fact that photon behavior in a dielectric structure is similar to the behavior of electrons in a semiconductor. The periodic arrangement of atoms in a semiconductor lattice opens up forbidden gaps in the energy band diagram for the electrons. Similarly in all-dielectric PBG structures, the periodic placement of dielectric "atoms" opens up forbidden gaps in the photon energy bands.

The idea of PBGs has led to the proposal of many novel applications at optical wavelengths, such as thresholdless lasers, single-mode light-emitting-diodes and optical wave guides. In addition, PBGs are already being used in the millimeter and microwave regimes, where the applications include efficient reflectors, antennas, filters, sources and wave guides. They have also found possible applications as infrared filters.

The PBG structures behave as ideal reflectors in the band gap region. Depending on the directional periodicity of these dielectric structures, the band gap may exist in 1-D, 2-D or all the three directions. Various lattice geometries were studied to find a periodic structure that would exhibit a photonic band gap in all the directions. After several unsuccessful attempts in finding the right lattice geometry using "trial-and-error" techniques, researchers at Iowa State University were first to predict the existence of a complete band gap in a periodic dielectric structure arranged in diamond lattice geometry. Diamond lattice ran structures were calculated to have large gaps for a refractive index ratio between the two at dielectrics as low as two.

Further research indicated that, similar to the impurity doping in a semiconductor, localized electromagnetic modes can be created in the band gap region of PBG structures by introducing defects that disturb the periodicity of the structure. This defect can be achieved by removing a part of the PBG structure, thus creating states similar to the semiconductor behavior with acceptor atoms. The defect can also be achieved by adding extra material to the crystal, which acts like a donor atom of a semiconductor. The defect gives rise to donor modes which have their origin at the bottom of the conduction band. Experiments have shown that the acceptor modes, acting like cavities, are of greater importance with their highly localized and single-mode cavity characteristics. In photonic crystals with defects, the transmission spectrum is changed by the presence of a narrow transmission peak within the band gap. Defect peaks with quality factors in the range of 1000–2000 have been experimentally demonstrated.

After the initial research into the existence of photonic band gap, there was an increased effort to find new structures that could be more easily fabricated. These fabrication techniques include creating the PBG structure through emulsions, with carbon structures, and by creating crystals by a liquid-phase chemical reaction to infiltrate a polystyrene template. These manufacturing techniques allow the defect to be introduced by adding extra material to the crystal or by removing material after the photonic band gap structure has been built. This increases the manufacturing time and cost of the photonic band gap structures. What is needed is a way to manufacture a photonic band gap structure that provides the capability to introduce defects without adding extra material or removing material after the photonic band gap structure is built.

BRIEF SUMMARY OF THE INVENTION

It is an object of the instant invention to overcome at least some of the aforementioned and other known problems existing in the art. More particularly, it is an object of the instant invention to provide a new and improved method of manufacturing a photonic band gap structure allowing operation in the optical region. It is a further object of the instant invention to provide a new and improved method of manufacturing PBGs having a three-dimensional photonic band gap structure. It is also an object of the instant invention to provide a new and improved method of manufacturing photonic band gap structures having adjustable process steps resulting in varying photonic band gap structures whose performance characteristics are adjusted to meet specific performance requirements. Furthermore, it is an object of the instant invention to provide a new and improved method of manufacturing photonic band gap structures utilizing micro-transfer molded structures.

In view of the above objects, it is a feature of the instant invention to provide a method of manufacturing photonic band gap structures which utilize simple cost effective micro-transfer based construction techniques. It is an additional feature of the instant invention that the photonic band gap structures resulting from the method of manufacturing of the instant invention have characteristics of simple high pass filters, band stop filters, or filters having more complex transmission characteristics in the optical region depending upon the periodic pattern of the grids. Furthermore, it is a feature of the instant invention that the photonic band gap structures resulting from the method of the instant invention are lightweight and compact.

In accordance with an embodiment of the instant invention, a method of manufacturing a photonic band gap structure operable in the optical region comprises the steps of: a) creating a patterned template for an elastomeric mold; b) fabricating an elastomeric mold from polydimethylsiloxane (PDMS) or other suitable polymer; c) filling the elastomeric mold with a second polymer; d) stamping the second polymer (epoxy) by making contact with a substrate or multilayer structure; e) introducing a ceramic bearing material (e.g., a sol or slurry) into the second polymer to form a ceramic and epoxy structure; f) heating the ceramic-epoxy structure to remove the epoxy.

The method of the instant invention may be repeated to produce multi-layer structures of 1, 2, 3, 4, 5, etc. layers. These method steps may be performed so that the thickness of dielectric layers separating the patterns are approximately equal, or are unequal. These steps include, in the step of forming a second or middle pattern in a three layer structure, the step of introducing a defect in the pattern. This defect may be adjusted to control a parameter of a filter characteristic. The second polymer may be made with a slurry or sol gel infiltration and may also be made with metal infiltration. The second polymer may also be an epoxy or other suitable polymers of appropriate viscosity and with physical and chemical properties that allow the building of a layered structure and removal via pyrolysis. Additionally, each step of forming a pattern may include the step of introducing a defect in the pattern.

In one embodiment, the photonic band gap structure is formed with layers of rods stacked on top of each other, each layer having its axes oriented at 90° with respect to adjacent layers, alternate layers having their axes parallel to each other with the rods of one layer in offset between the rods of the other layer forming a three-dimensional structure of stacked layers having a four-layer periodicity, the dielectric rods arranged with parallel axes at a given spacing to form a planar layer and arranged in a material having a different and contrasting refractive index, the dimensions of the rods, the spacing between the rods and the refractive contrast of the materials selected to produce a photonic band gap operable in the optical region made by the method of the instant invention.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 10b is an enlarged image of the photonic structure of FIG. 10a;

FIG. 11 is an image of the top view of the photonic structure of FIG. 10a;

FIG. 12b is an enlarged image of the photonic structure of FIG. 12a;

FIG. 13b is an enlarged image of the photonic structure of FIG. 13a;

FIG. 14b is an enlarged image of the epoxy mold of FIG. 14a;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
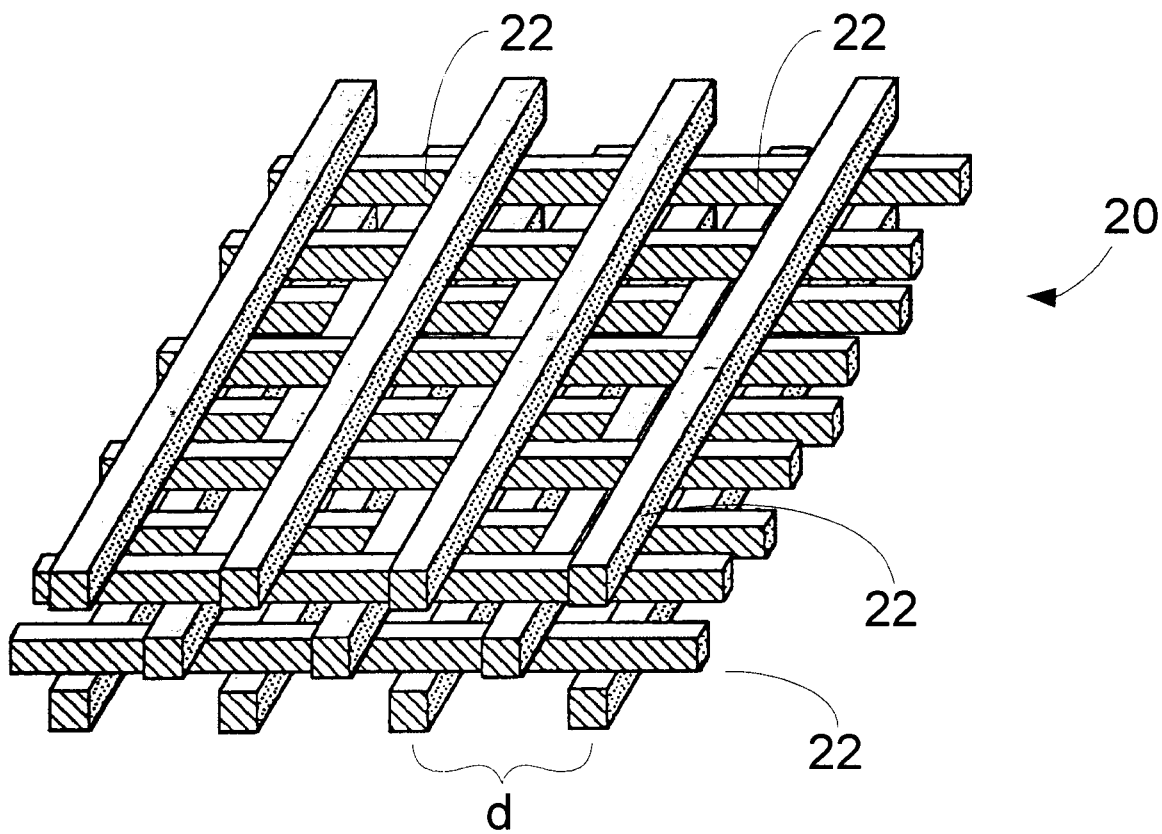
FIG. 1 is a simplified isometric illustration of a layer-by-layer photonic band gap structure manufactured in accordance with the teachings of the present invention.

Turning now to FIG. 1, theoretical band calculations in conjunction with experimental measurements have firmly established that the structure 20 has a fundamental full photonic band gap. This occurs between the lowest set of bands (i.e., bands 2 and 3). The structure 20 has a layer of rods stacked on top of each other. Each layer of rods consists of an ordered array of parallel rods 22, with a spacing d between rods 22. The axes of each layer are oriented at 90° with respect to adjacent layers. Alternate layers have their axes parallel to each other with the rods 22 of one layer in offset between the rods 22 of the other layer forming a three-dimensional structure of stacked layers having a four-layer periodicity The offset between alternate layers in one embodiment is half the spacing d (i.e., d/2). The rods 22 can be fabricated with dielectric or non-linear materials.

In the description that follows, epoxy will be used to describe the building of a photonic band gap. Other suitable polymers of appropriate viscosity and with physical and chemical properties that allow the building of a layered structure and removal via pyrolysis may be used.

Figure 2:
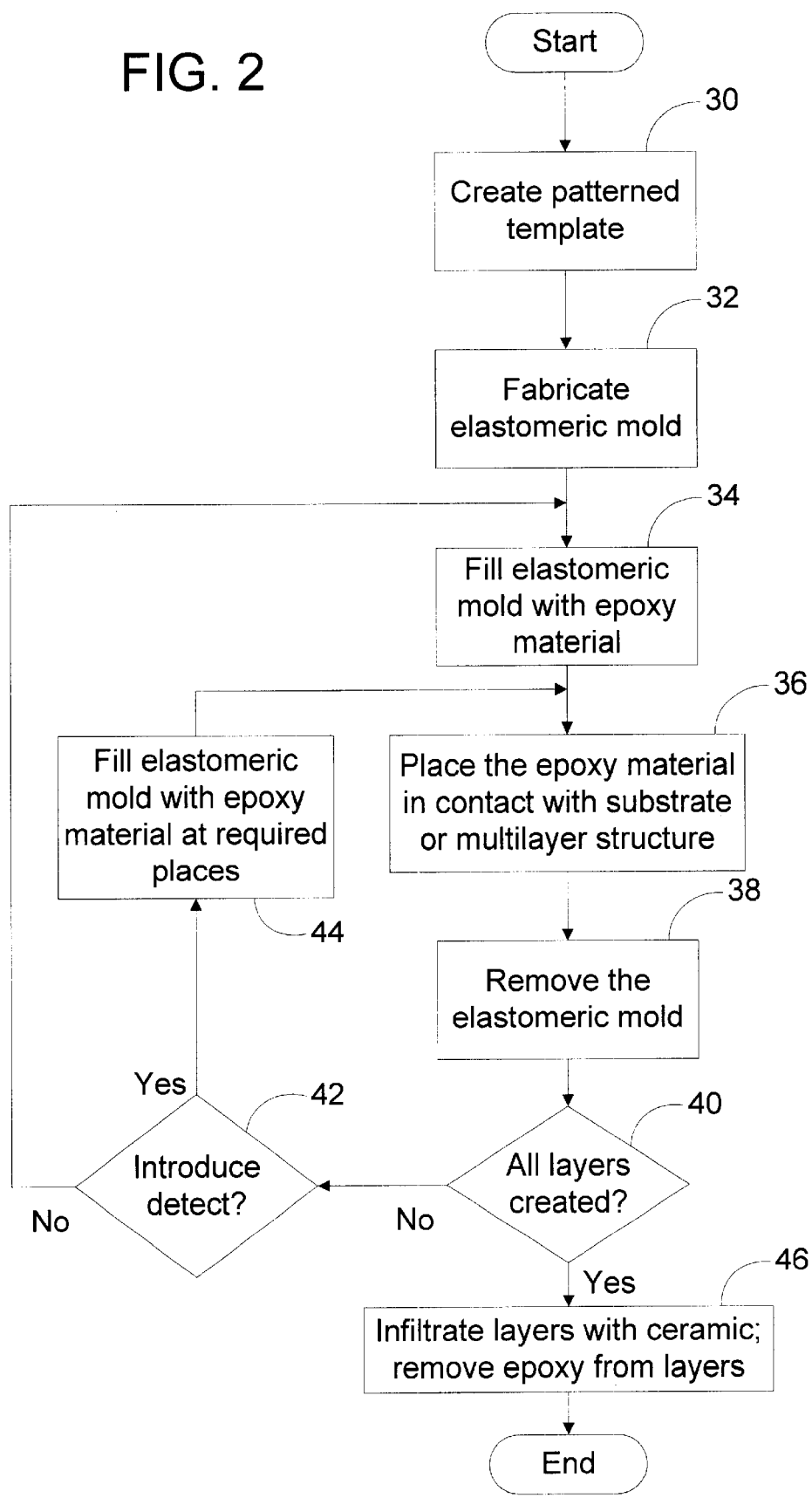
FIG. 2 is a flow chart illustrating the manufacturing process utilized in accordance with the teachings of the present invention.
Figure 3A:
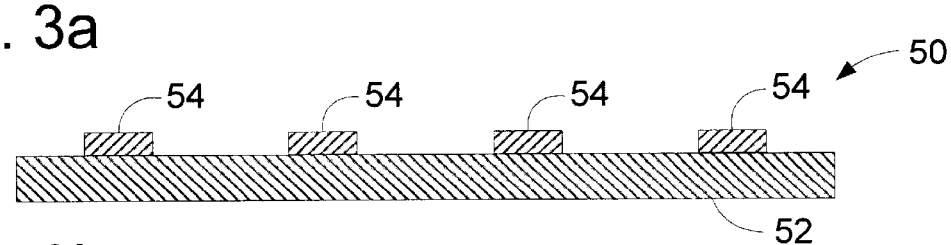
FIGS. 3a–3f are an isometric illustration of a portion of the steps of the manufacturing process of FIG. 2.
Figure 3B:
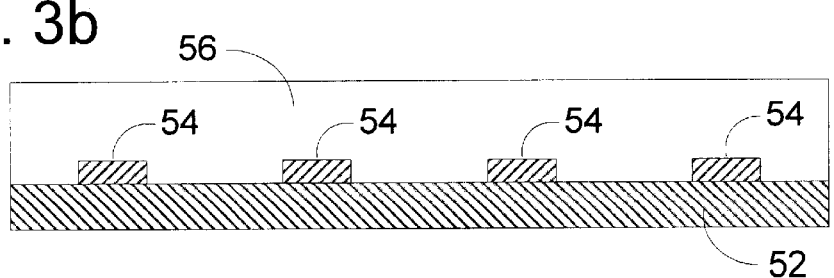
Figure 3C:
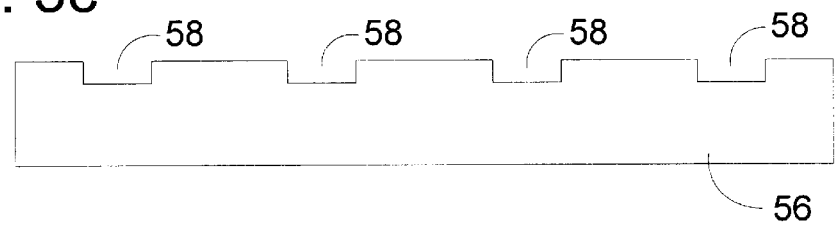
Figure 3D:
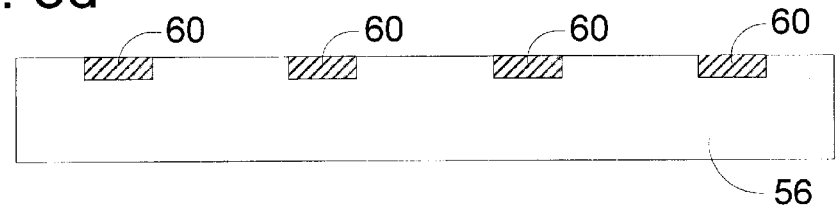
Figure 3E:
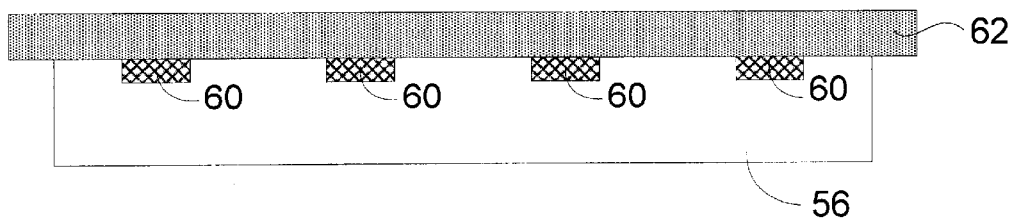
Figure 3F:
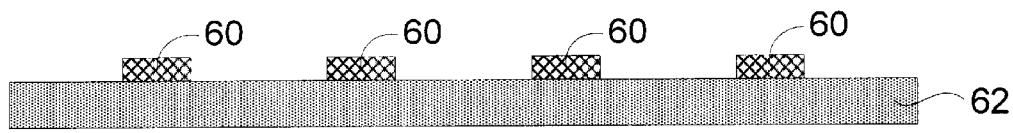

Turning now to FIG. 2 with reference to FIG. 3, the process of the present invention used to manufacture the photonic structures will be described. The three dimensional photonic structure is prepared in a multiple stage process. A patterned template 50 (see FIG. 3a) is created for use in fabricating an elastomeric mold (step 30). Typically, the patterned template 50 only has parallel lines. However, it should be recognized that any pattern may be used for the patterned template 50. In one embodiment, the patterned template is made by spinning on a layer of photoresist 54 on a silicon wafer 52. Photolithography or e-beam lithography is used to generate a multiple line pattern on the resist-covered wafer 52 and the resist is developed, resulting in the patterned template 50.

An elastomeric mold 56 is fabricated (step 32). The elastomeric mold is obtained by pouring PDMS (polydimethylsiloxane) or other suitable polymer on the patterned template 50 (see FIG. 3b). After the elastomeric mold is cured, it is peeled off of the patterned template 50, resulting in an elastomeric mold 56 having channels 58 reflecting the structure of the patterned substrate (see FIG. 3c). The channels 58 are filled with an epoxy 60 (step 34). The elastomeric mold 56 is placed in contact with a substrate 62 (e.g. stamped) or an existing layer of the photonic structure (not shown) (step 36) and the elastomeric mold 56 is removed (step 38). The substrate 62 is typically glass or silicon. It should be noted that other substrate material may be used.

If all layers have not been created (step 40), the process is repeated until the desired number of layers has been built. The first stamping process results in a layer of parallel polymer rods on the substrate. When the process is repeated for an additional layer, the stamping is done on the previous layer of parallel polymer rods such that the axis of the additional layer is oriented at an approximately ninety degree angle with respect to the axis of the previous layer of parallel polymer rods. Alternate layers are stamped such that the polymer rods have their axes parallel to each other with the polymer rods of one layer in offset between the polymer rods of the other layer. Alignment of layers is described hereinbelow. In one embodiment, the layers are stacked to form a three-dimensional structure of stacked layers having a four-layer periodicity.

Figure 4:
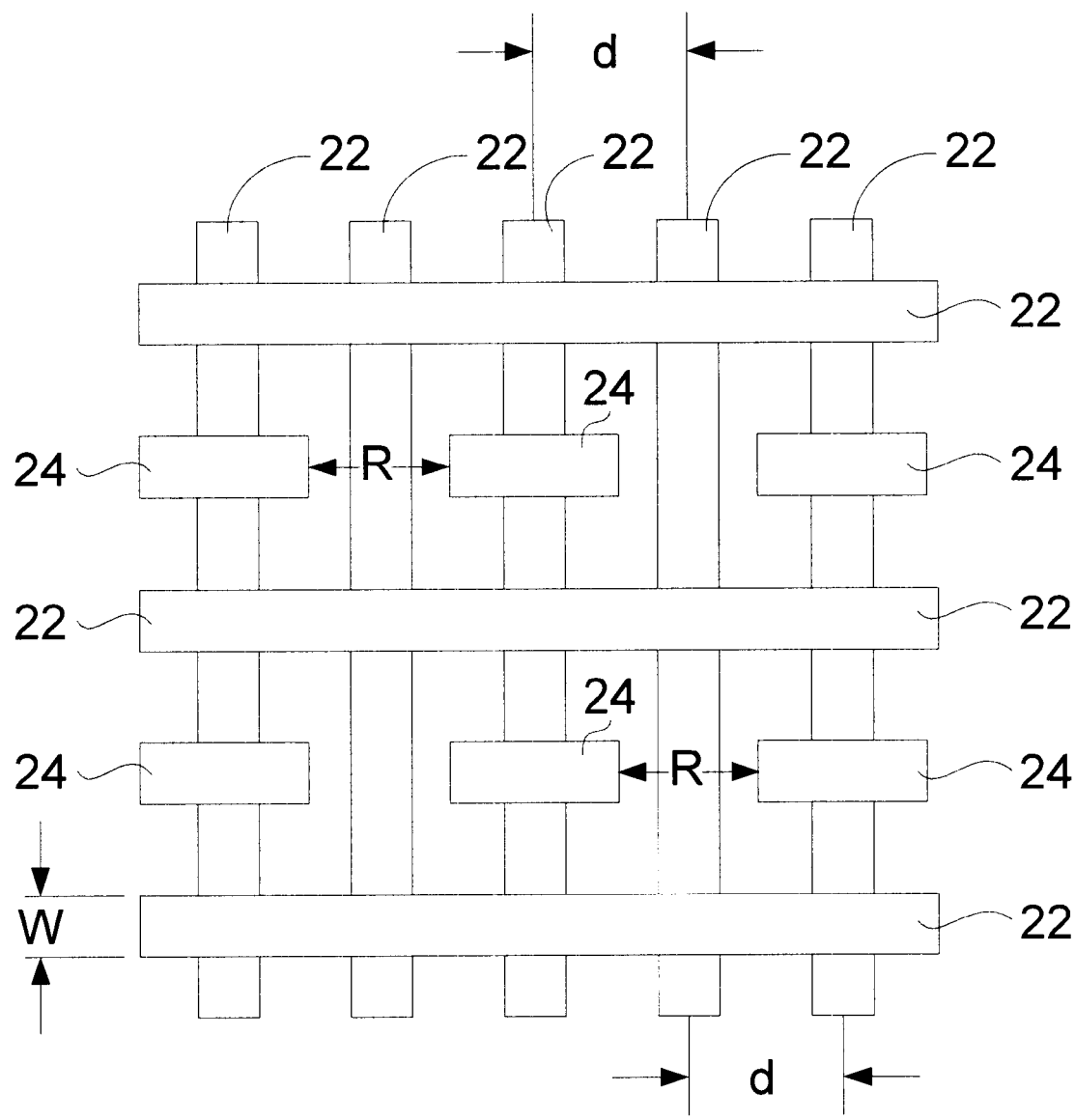
FIG. 4 is a schematic illustration of two layers of a photonic structure with one layer having defects introduced therein.

A defect may be introduced into one or more of the middle layers of the photonic structure 20 (step 42). If no defect is to be introduced, the steps 34–40 are repeated until the desired number of layers is achieved. If a defect is introduced, a select portion of the channels 58 of the elastomeric mold 56 are not filled with epoxy material (step 44) and steps 36 and 38 are repeated. The defect is introduced by leaving openings of length R in rods 24 as shown in FIG. 4. The defect introduces a defect peak in the band gap of the photonic structure 20. The defect may be adjusted to control a parameter of a filter characteristic such as the location of the defect peak, the quality factor of the defect peak, etc. One or more layers of the photonic structure 20 may have defects introduced. It has been shown that increasing the number of defect layers improves the quality factor of the defect peak and moves it to a lower frequency within the band gap. The process as described in steps 34–44 are repeated until the desired number of layers is achieved.

If all layers have been created, a ceramic in the form of a slurry or pre-ceramic sol is infiltrated into the epoxy structure resulting in a ceramic-epoxy structure and the ceramic-epoxy structure is heated to remove the epoxy (step 46). The ceramic can be either in the form of a heavily loaded ceramic slurry of very fine ceramic particles or in the form of a pre-ceramic sol. After the resulting structure is dried or dried and heat-treated, the epoxy is removed leaving a ceramic photonic structure. The photonic structure can be densified through further heat treatment. The structures may also be made with metal infiltration to produce metallic photonic band gap structures.

In one embodiment, the ceramic 60 is made using a ceramic slurry infiltration. The ceramic slurry is made with a 10–40 weight percent suspension with titania (or other suitable material) nanoparticles (SA=60–100 cm$^2$/gm) in DI water with a suitably adjusted pH in the range of 9–12. Agglomerates are broken with an ultrasonic disrupter for approximately 5 minutes. Dispersants (e.g. Sodium hexametaphosphate or SHMP) 1–2% by weight can be added to the slurry to prevent re-agglomeration. Binders can also be added for mechanical strength of the green state. The suspension is centrifuged to remove larger diameter particles, agglomerates and aggregates so that the resulting suspension contains only particles of dimensions much less than the feature size of the polymer rods. The channels in the epoxy structure are infiltrated using this suspension. In one embodiment, drying of the suspension is done in a humidity-controlled environment to prevent stress cracks. Isostatic pressing can be used to further densify the material. The epoxy 60 is then removed by heat treatment at a temperature range of 400–800° C.

Alternatively, the ceramic can be made with a pre-ceramic sol gel infiltration. Sol gel infiltration is accomplished first by making a sol, then inducing gelation. The sol is made by mixing an organic precursor (e.g. titanium diisopropoxide bis (2,4-pentadionate) (TDBP), tetraethylorthotitanate (TEOT), titanium isopropoxide (TIPP)) with an appropriate solvent (e.g. 2-propanol, ethanol) and adding water. It should be noted that other organic precursors (e.g. titanium n-butoxide) may be used. Gelation is induced by adding an appropriate catalyst (e.g. HF, HCl, HNO$_3$, NaOH, KOH or HI) and it occurs over a period of time. The time period is dependent upon the chemistry of the precursor, the solvent and the catalyst used. The ratio of the precursor:alcohol:water is approximately 12–40:50–85:3–10 by weight percent and it varies with the chemistry. The solution is introduced to the epoxy structure by spin coating either a single time or repetitively. The resulting sample is dried at an elevated temperature between coatings and the epoxy 60 is removed through subsequent heat treatment.

Those skilled in the art will recognize that applying epoxy or other suitable polymer can be difficult since most polymer systems are non-wetting. Capillary action is not suitable to draw the epoxy into the channels due to the narrowness of the channels. The application of epoxy into the elastomeric mold 56 can be facilitated in a number of different ways.

In one embodiment, a standard screen printing device is modified to apply the epoxy into the channels. The elastomeric mold 56 typically has a rough surface, so the squeegee blade is made from a flexible material such as a flexible polymer to accommodate the elastomeric mold 56. No mesh (i.e, screen) is used since the elastomeric mold 56 has the desired pattern (i.e., the channels 58). The height of the blade is adjusted so that the elastomeric mold 56 is slightly deformed as the blade is swept across the surface of the elastomeric mold 56. Epoxy is introduced onto the elastomeric mold 56. The pressure of the blade as it sweeps across the surface forces the epoxy 60 into the channels 58. Alternatively, a squeegee may be manually swept across the surface to force the epoxy 60 into the channels 58. Curing of the epoxy 60 is initiated as the epoxy 60 enters the channels 58. The epoxy viscosity changes, which results in the epoxy 60 staying in the channel 58, thereby allowing the channel 58 to be completely filled.

Figure 5A:
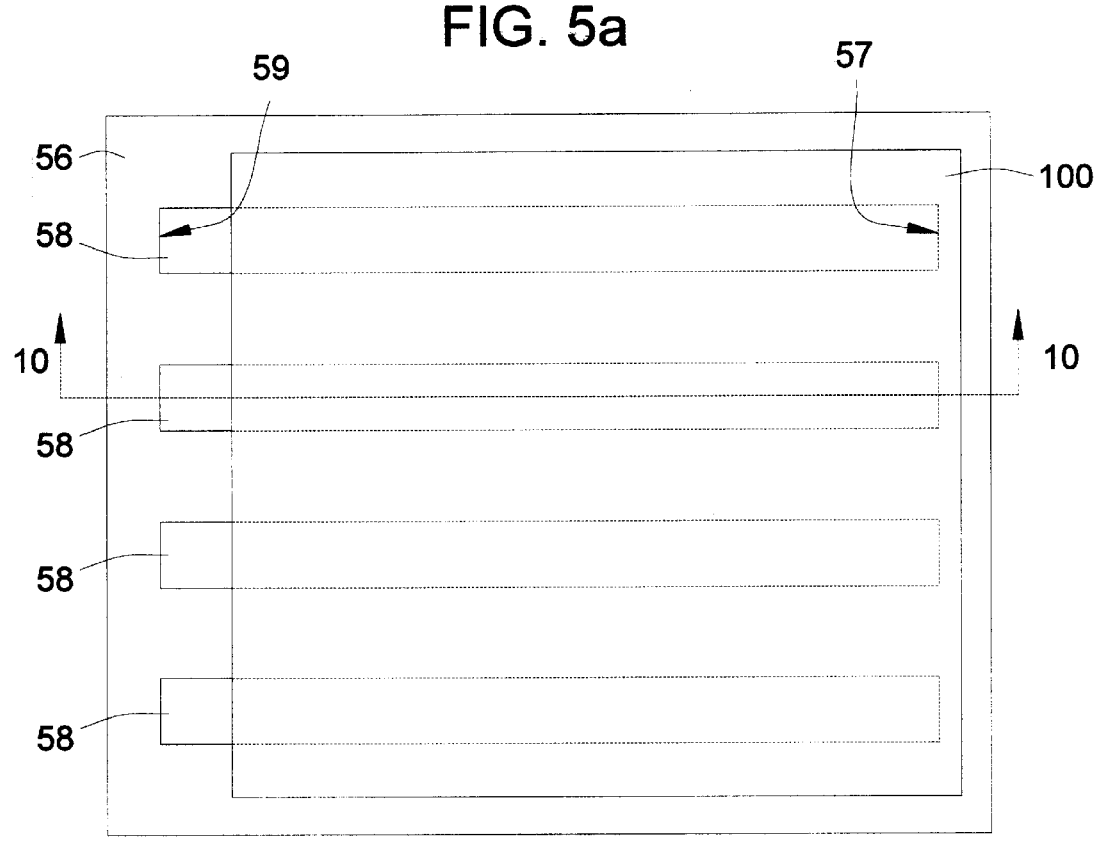
FIGS. 5a–5c are illustrations of a technique to apply epoxy into an elastomeric mold in accordance with the teachings of the present invention.
Figure 5B:
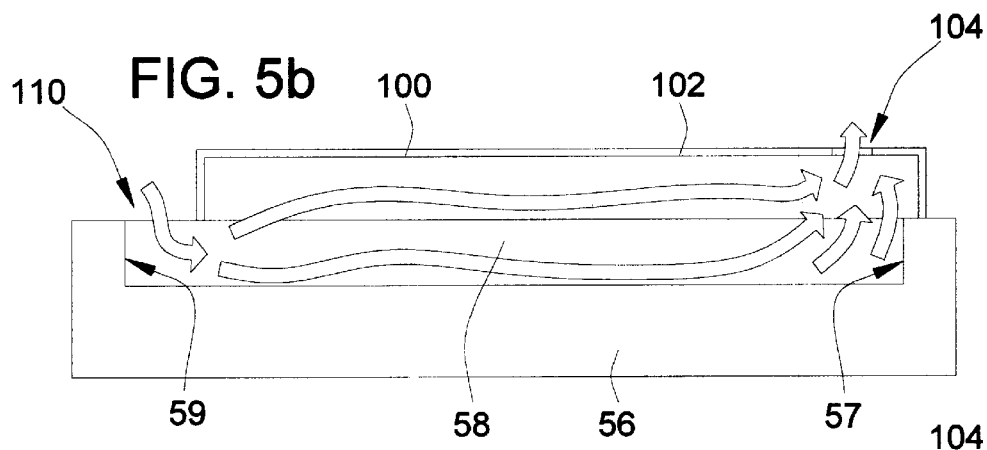
Figure 5C:
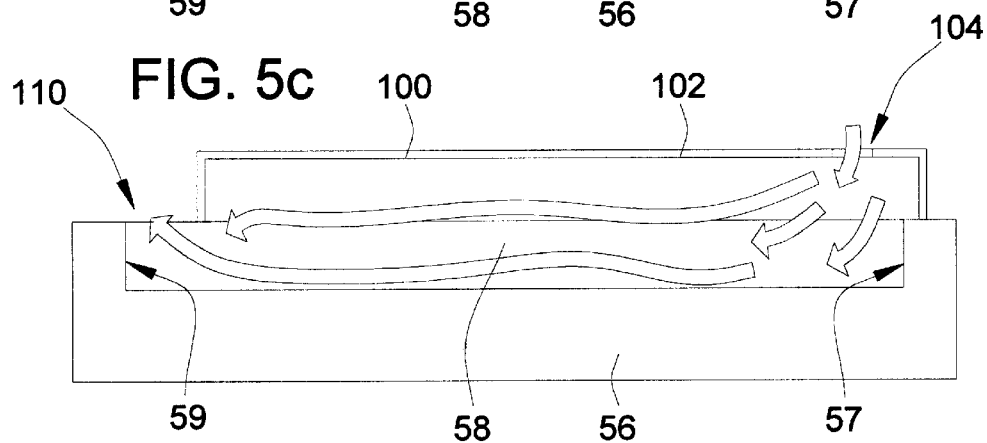

An alternate embodiment of applying the epoxy 60 is illustrated in FIGS. 5a–5c. A chamber 100 is placed over the elastomeric mold 56 such that one end 57 of the channel 58 is covered by the chamber and the other end 59 is open. The epoxy 60 is injected into the opening 110 and forced into the channels by a vacuum created at an opening 104 on the chamber top 102 (see FIG. 5b). The arrows indicate the direction of epoxy flow. Curing of the epoxy 60 is initiated as the epoxy 60 enters the channels 58. The epoxy viscosity changes, which results in the epoxy 60 staying in the channel 58. The vacuum can be created by a syringe or other instruments. Alternatively, the epoxy 60 can be injected through the opening 104 (see FIG. 5c) or an opening in the side of the chamber 100. The pressure of the injection forces the epoxy 60 into the channels 58 and through the opening 110. The arrows indicate the direction that the epoxy flows. A vacuum can be used at the opening 110 to draw the epoxy into the channels.

The scale of the photonic structure 20 can be controlled by adjusting the size and separation of rods 22 (e.g., channels 58) in the patterned template 50 used for the mold 56. For ceramic processing with titania, a refractive index contrast (n) near 2.2 is appropriate. To achieve optical photonic band gaps, a rod width w (see FIG. 4) of 0.1–0.15 microns is necessary. To achieve a photonic band gap in the red (0.67 micron), a 0.1 micron rod width must be used with a separation d of 0.29 micron.

The specific dimensions (microns) and resulting gap wavelengths (microns) are shown in Table 1.

TABLE 1

| fill ratio | Rodwidth (microns) | sep-aration | height | midgap | lower-edge | upper-edge |
|---|---|---|---|---|---|---|
| refractive index (n) = 2.2 | | | | | | |
| 0.25 | 0.1 | 0.4 | 0.14 | 0.75 | 0.81 | 0.68 |
| 0.33 | 0.1 | 0.3 | 0.107 | 0.63 | 0.69 | 0.57 |
| 0.35 | 0.1 | 0.29 | 0.1 | 0.62 | 0.67 | 0.55 |
| 0.4 | 0.1 | 0.25 | 0.09 | 0.56 | 0.61 | 0.5 |
| 0.33 | 0.15 | 0.45 | 0.16 | 0.95 | 1.04 | 0.85 |
| 0.33 | 0.25 | 0.75 | 0.27 | 1.57 | 1.72 | 1.43 |
| refractive index (n) = 2.5 | | | | | | |
| 0.25 | 0.1 | 0.4 | 0.14 | 0.85 | 0.95 | 0.75 |
| 0.35 | 0.1 | 0.29 | 0.1 | 0.67 | 0.75 | 0.59 |
| 0.40 | 0.1 | 0.25 | 0.09 | 0.61 | 0.68 | 0.54 |

The best-performing geometry has a filling ratio ranging from 35 to 28% for refractive index contrasts ranging from 2.2 to 3.6.

Alignment of band gap layers can be tricky due to the size of the rods. The rods in a photonic band gap such as those shown in FIG. 1 look like grids when viewed in several directions (e.g., in the x, y, and z axis). The direct way to align layers is to see the grid in the layers in one direction (e.g., in an x axis) and in an other direction (e.g., in a y axis) and align the layers by arranging the grids. The rods cannot be seen in detail with optical microscopy because the length of the rods is far below the resolution of an optical microscope. A scanning electron microscope can be used to see the rods. However, the rods cannot be moved when using a scanning electron microscope. As a result, neither the optical microscope nor the scanning electron microscope are very effective by themselves to align the layers. Alignment can be done using lasers and optical light patterns.

In one embodiment, a laser is used to align pairs of layers of the structure (i.e., a two layer structure of adjacent layers). When a particle passes through a laser beam it causes light to be scattered. When a laser is pointed at the two layer structure, the structure scatters the laser light, resulting in a diffraction pattern of spots in a grid. The diffraction pattern of an aligned two layer structure (i.e., the two layers are perpendicular to each other) is a pattern of spots in a square grid. If the pattern of spots is not square, the layers are not aligned. For example, the diffraction pattern could be elongated in one dimension or could be at an angle (e.g., trapezoidal). When the pattern of spots is not square, the second layer of the structure is rotated until the pattern of spots is square.

Figure 6:
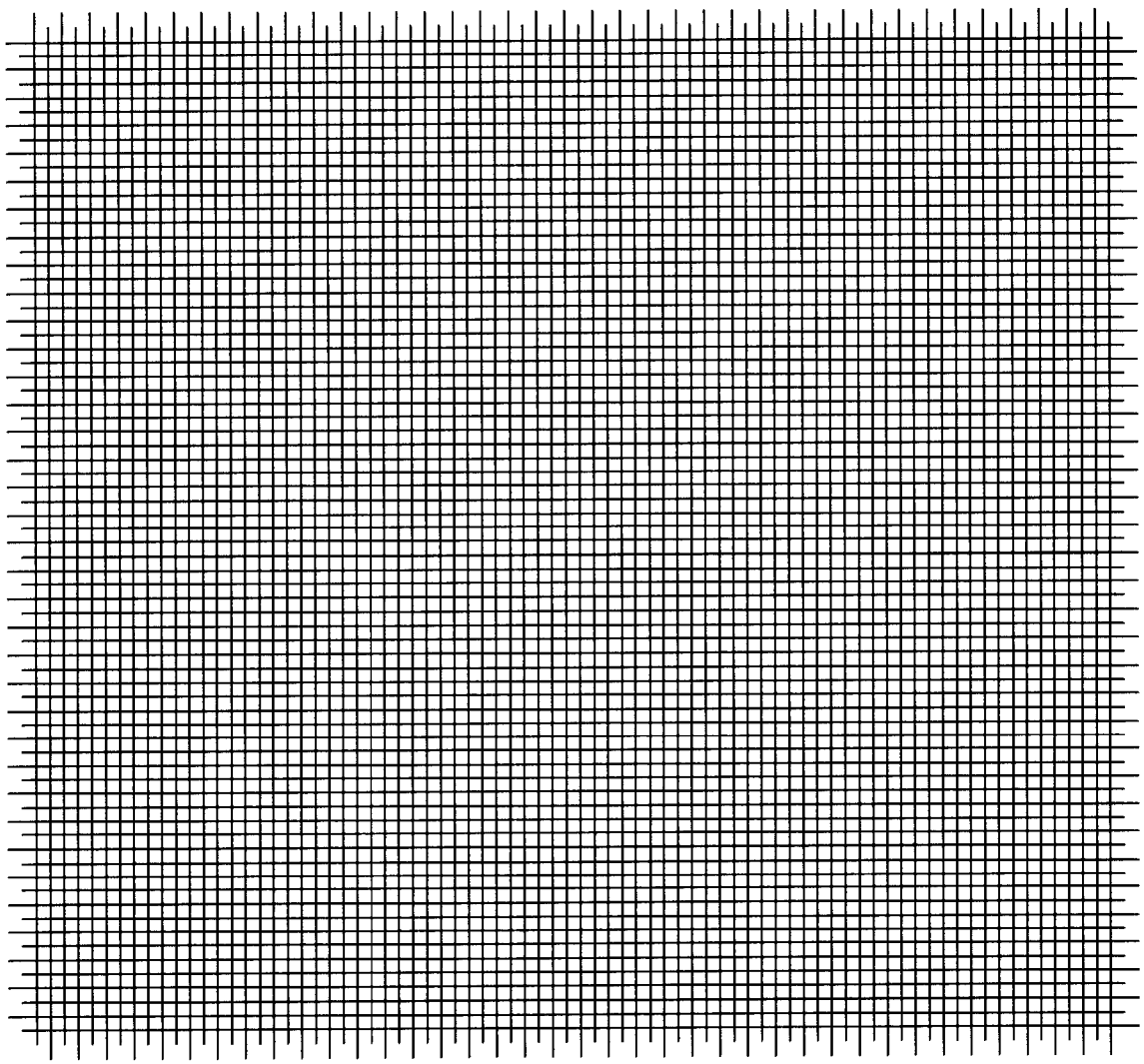
FIG. 6 is a top view illustration of a four layer aligned photonic structure.
Figure 7:
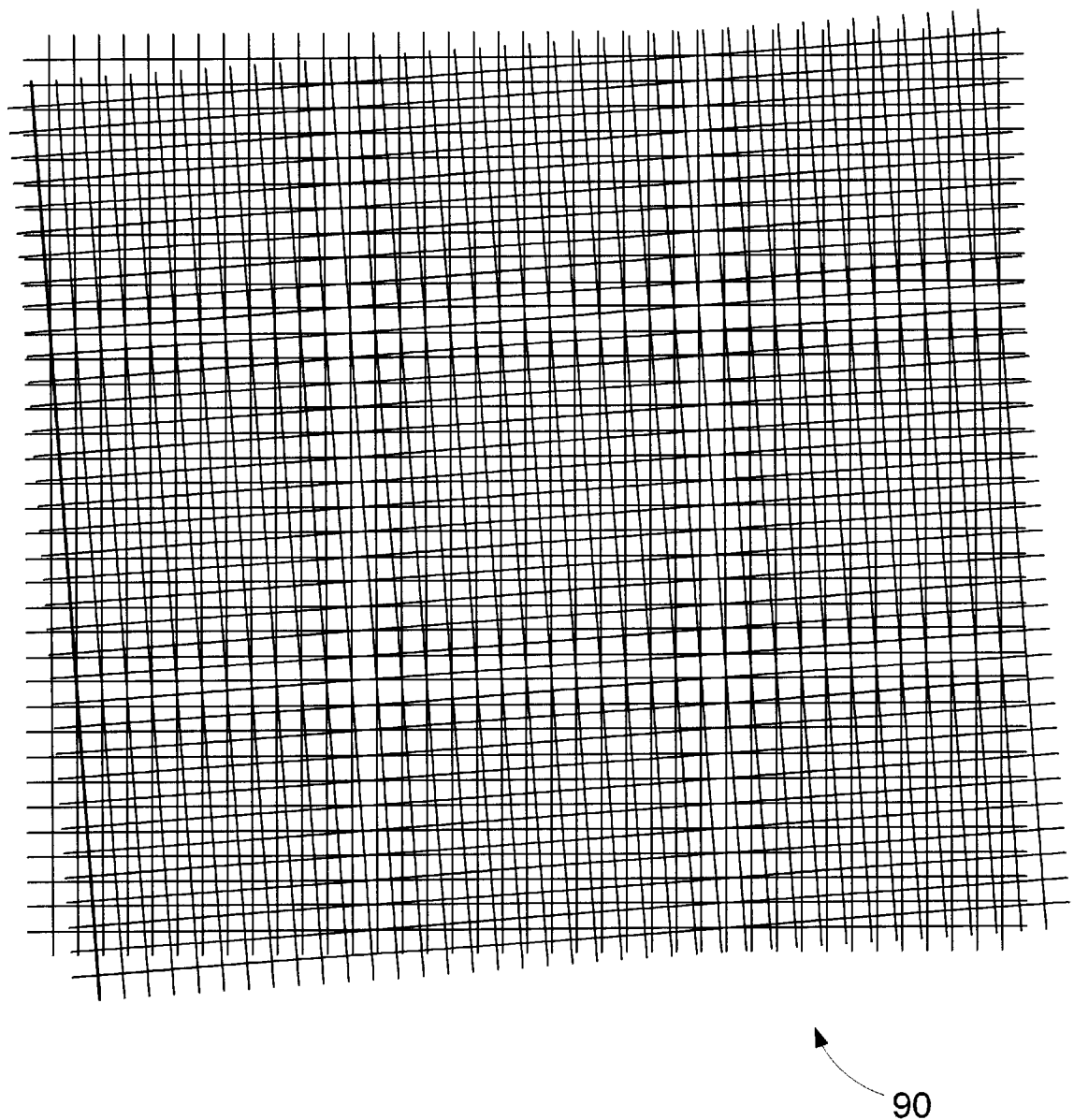
FIG. 7 is a two dimensional top view of a four layer photonic structure with the top two layers 4 degrees out of alignment with the bottom two layers.
Figure 8:
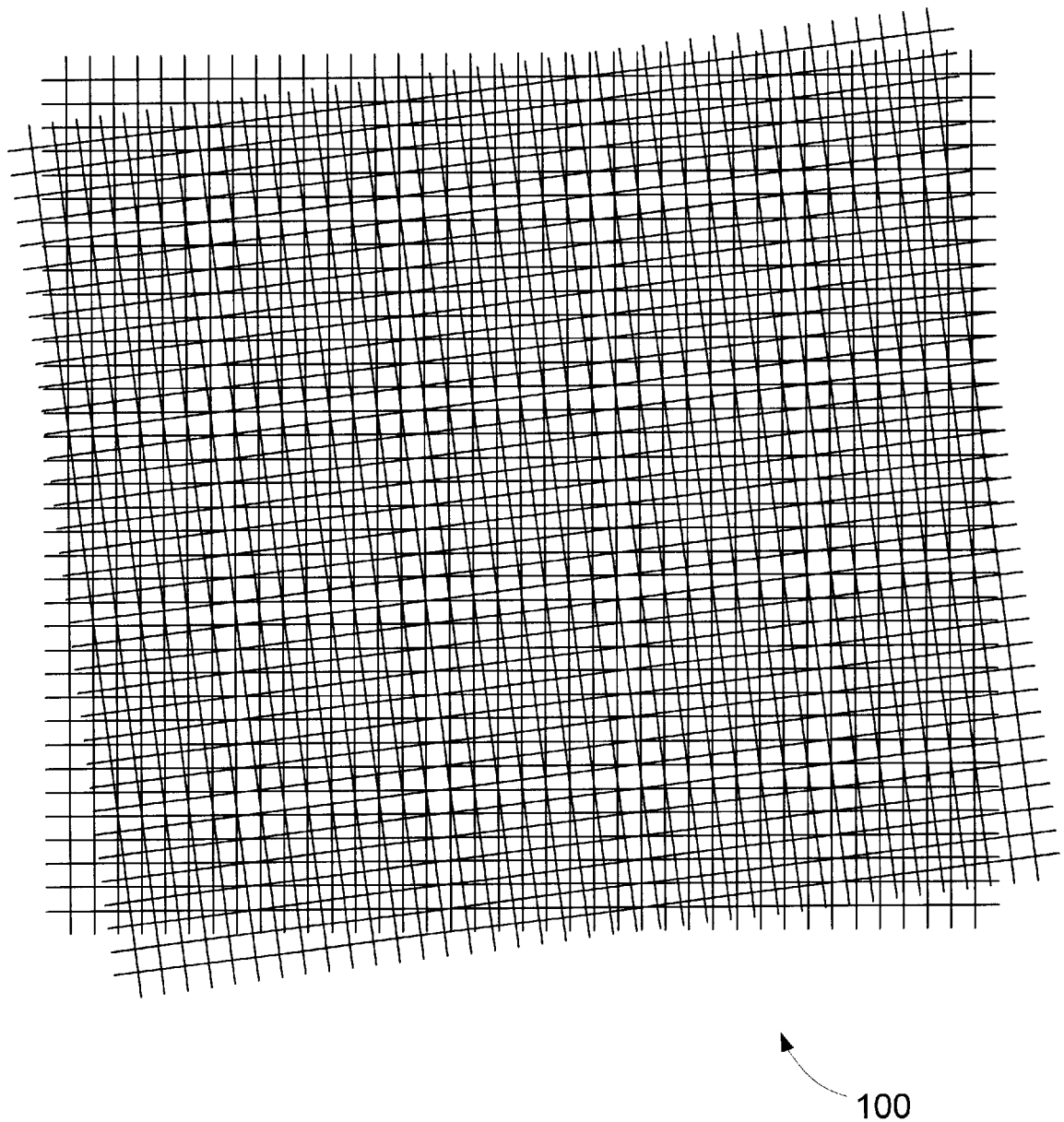
FIG. 8 is a two dimensional top view of a four layer photonic structure with the top two layers 7 degrees out of alignment with the bottom two layers.
Figure 9A:
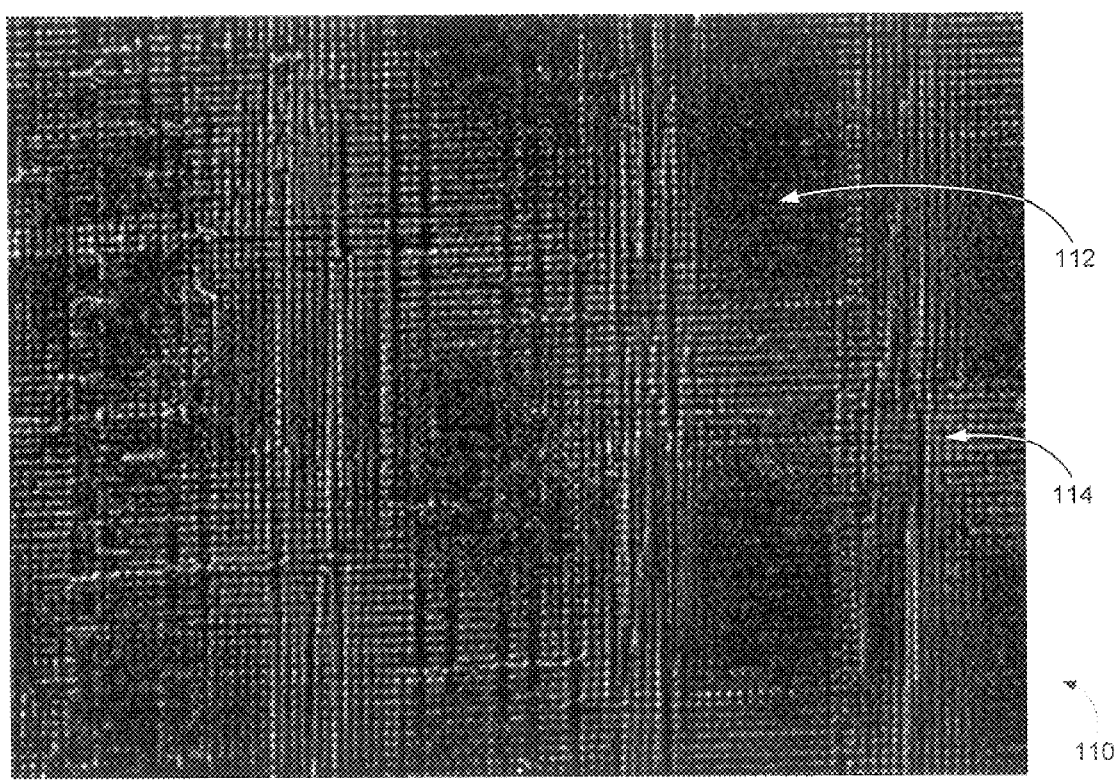
FIG. 9a is an image of a resulting light pattern of a light shined through a misaligned four layer photonic structure at a magnification of 400×.
Figure 9B:
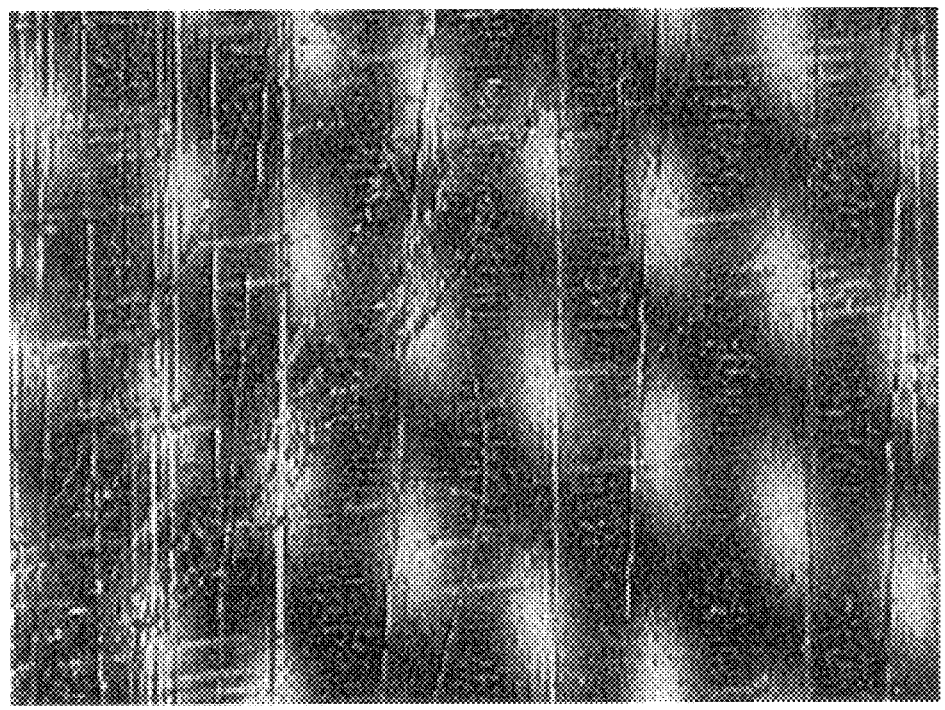
FIG. 9b is an image of a resulting light pattern of a light shined through a misaligned four layer photonic structure at a magnification of 200×.
Figure 9C:
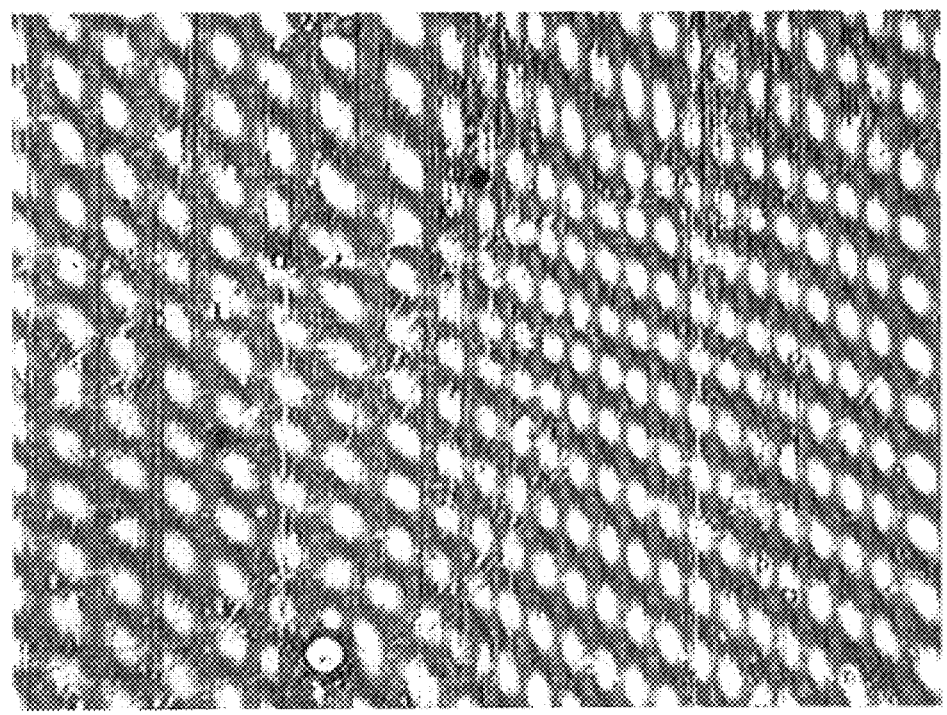
FIG. 9c is an image of a resulting light pattern of a light shined through a misaligned four layer photonic structure at a magnification of 50×.
Figure 10A:
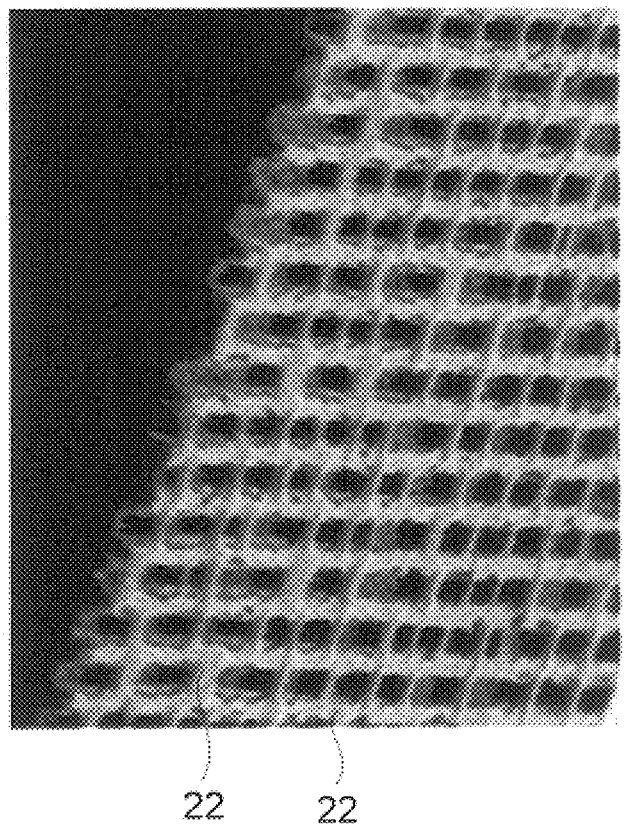
FIG. 10a is an image of a side-view of a two-layer photonic structure having a 2.5 $\mu$m periodicity manufactured using a slurry infiltration in accordance with the teachings of the present invention.
Figure 10B:
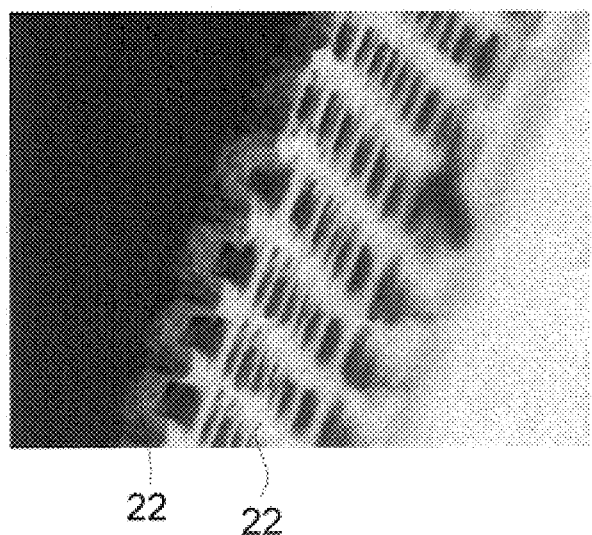

Light is used to align the pairs of layers when they are stacked on each other. In a band gap structure that has an offset between alternate layers of half the spacing d (i.e., layers are shifted 1/2 period in both the x and y directions), the resulting light pattern does not exhibit a moire pattern when light is shined through the photonic structure if the photonic structure is aligned. The resulting light intensity of the light pattern is also minimized in an aligned structure. When the structure is misaligned, the resulting light pattern that appears is a moire pattern when the light is shined through the structure and the light intensity is higher than the light intensity of an aligned structure. At least one pair of layers is rotated until the overall light intensity is minimized. FIG. 6 shows a simulated light pattern 80 of an aligned four layer structure. FIG. 7 shows a simulated moire pattern 90 of a four layer structure with layers that are rotated four degrees out of alignment. FIG. 8 shows a simulated moire pattern 100 of a four layer structure with layers that are rotated seven degrees out of alignment. FIG. 9 shows an actual moire pattern 110 of a four layer structure that is misaligned. It can be seen that the light intensity of the structure is minimized in areas 112 and highest in area 114. The areas 112 are the areas where the structure is closest to being aligned and area 114 is an area where the structure is farthest from being aligned.

Figure 11:
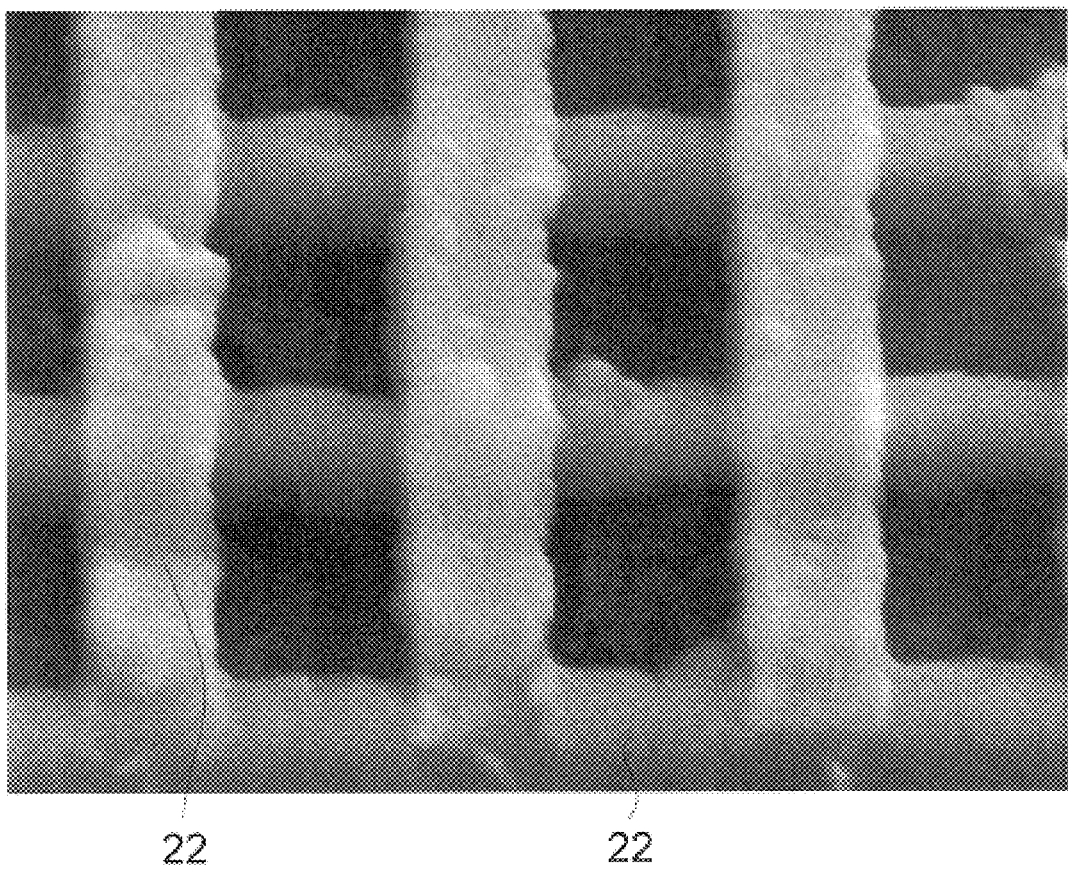
Figure 12A:
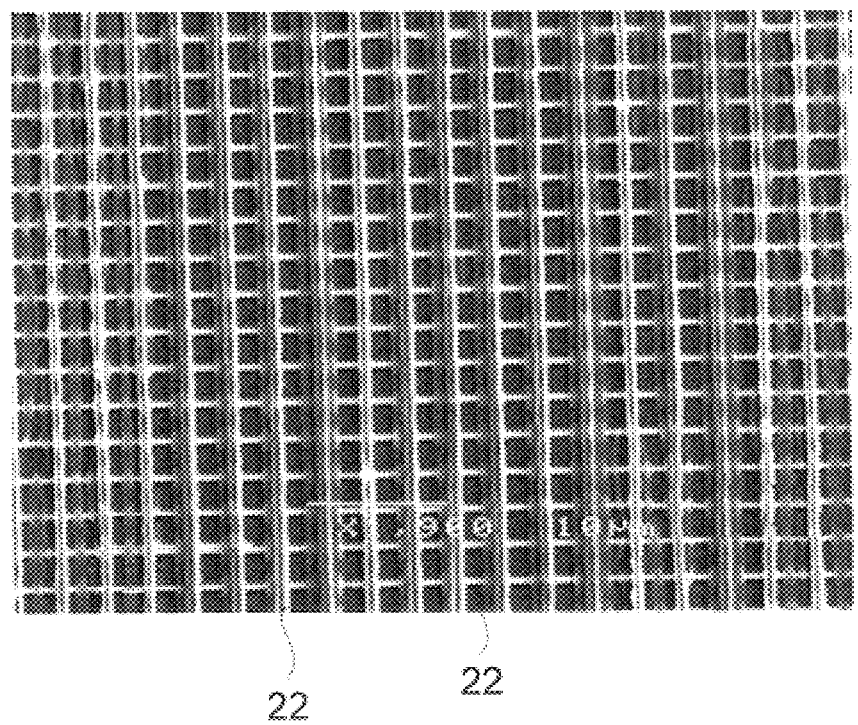
FIG. 12a is an image of a side view of a two-layer photonic structure having a 2.5 $\mu$m periodicity manufactured using a sol-gel infiltration in accordance with the teachings of the present invention.
Figure 12B:
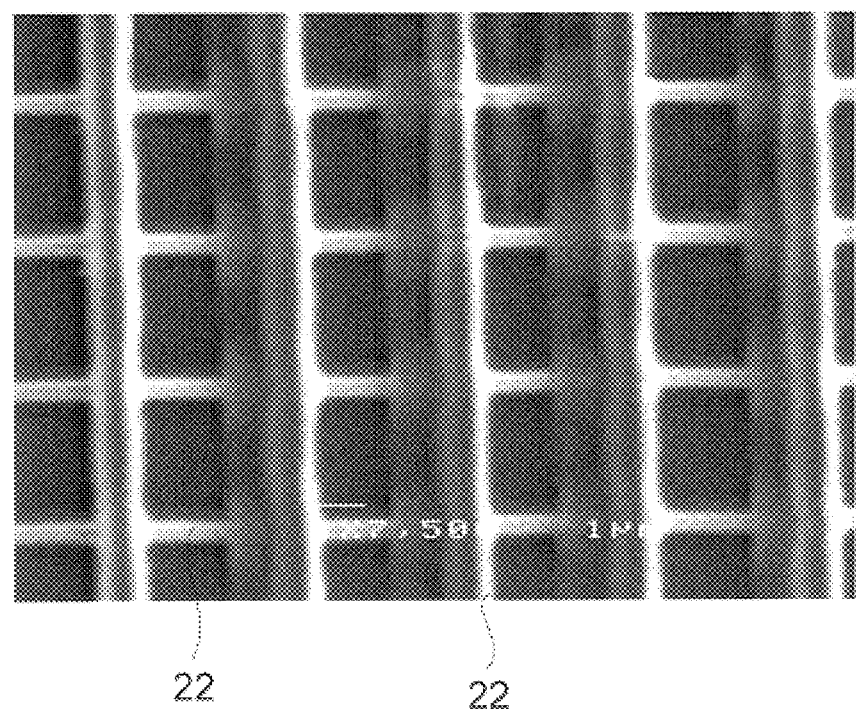
Figure 13A:
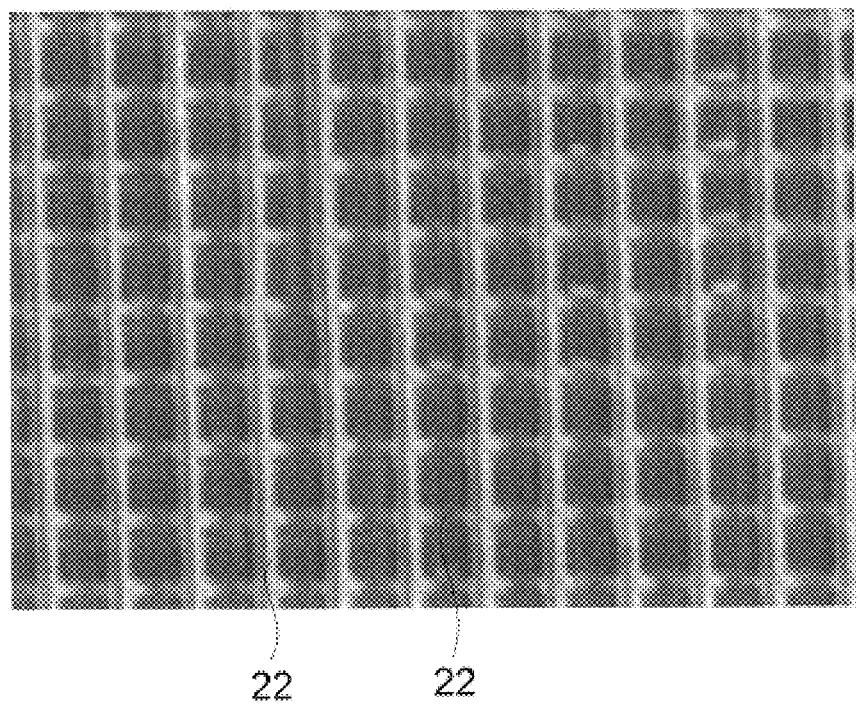
FIG. 13a is an image of a side view of a four-layer photonic structure having a 2.5 $\mu$m periodicity manufactured using a sol-gel infiltration in accordance with the teachings of the present invention.
Figure 13B:
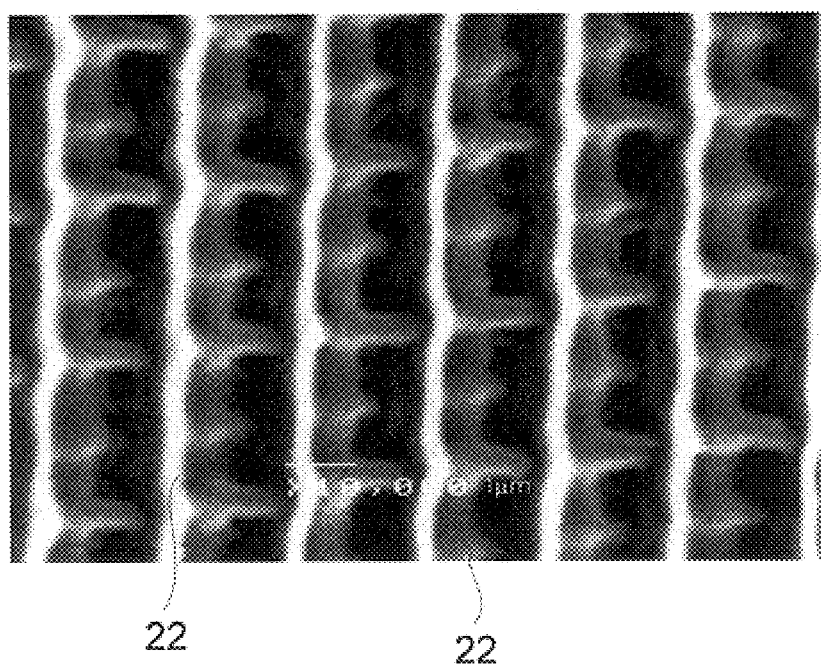

FIGS. 10–13 show 2.5 $\mu$m periodicity $TiO_2$ photonic structures made in accordance with the teachings of the present invention. FIGS. 10a, 10b and 11 show a two layer slurry infiltration. FIGS. 10a and 10b show a side view of a two layer slurry infiltration and FIG. 11 shows a top of the two layer slurry infiltration. FIGS. 12a and 12b show a two layer photonic structure made by spin coating of sol-gel. FIGS. 13a and 13b show a four-layer photonic structure made by spin coating of sol-gel.

Figure 14A:
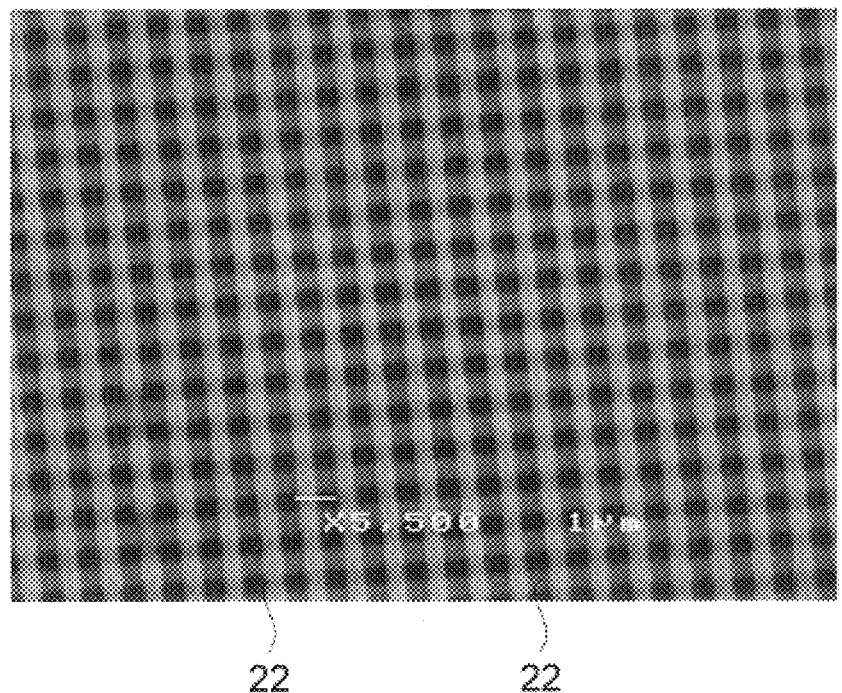
FIG. 14a is an image of a two-layer epoxy mold having a 1 $\mu$m periodicity made in accordance with the teachings of the present invention.
Figure 14B:
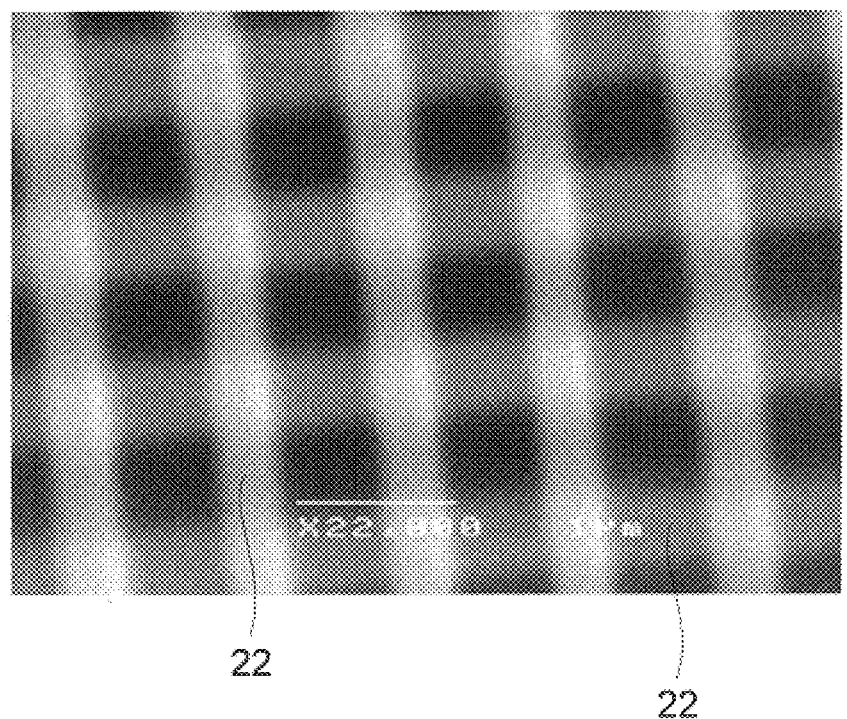

FIGS. 14a and 14b show a two layer polymeric mold (uninfiltrated) with a 1 $\mu$m periodicity, indicating that smaller-scale structures are possible using the techniques of the present invention. FIGS. 15a and 15b show a two layer titania photonic band gap structure having a 1 $\mu$m periodicity made with the mold of FIGS. 14a and 14b.

Figure 15:
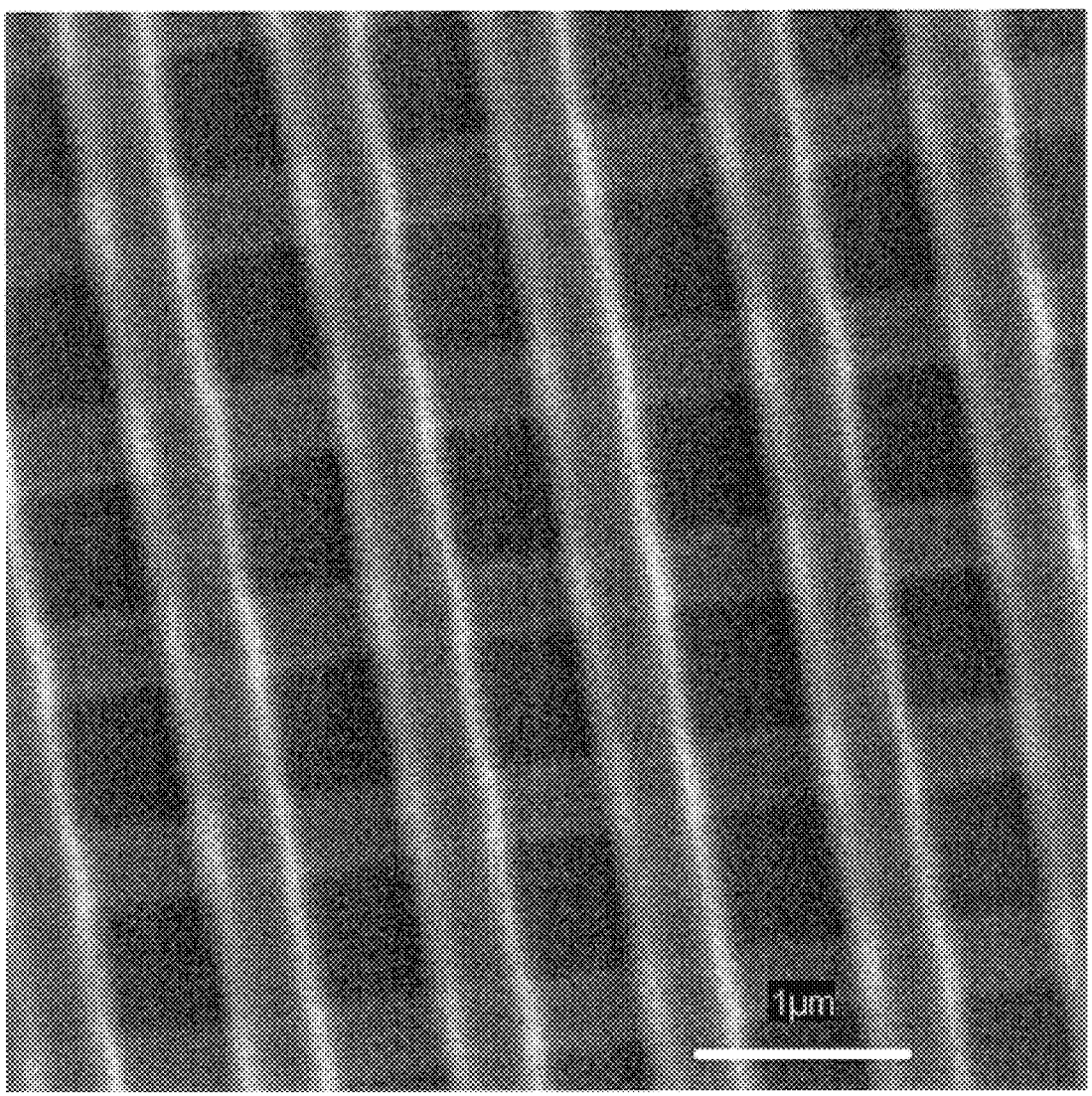
FIG. 15 is an image of a two layer ceramic photonic structure having a 1 $\mu$m periodicity made from the mold of FIGS. 14a and 14b.
Figure 16:
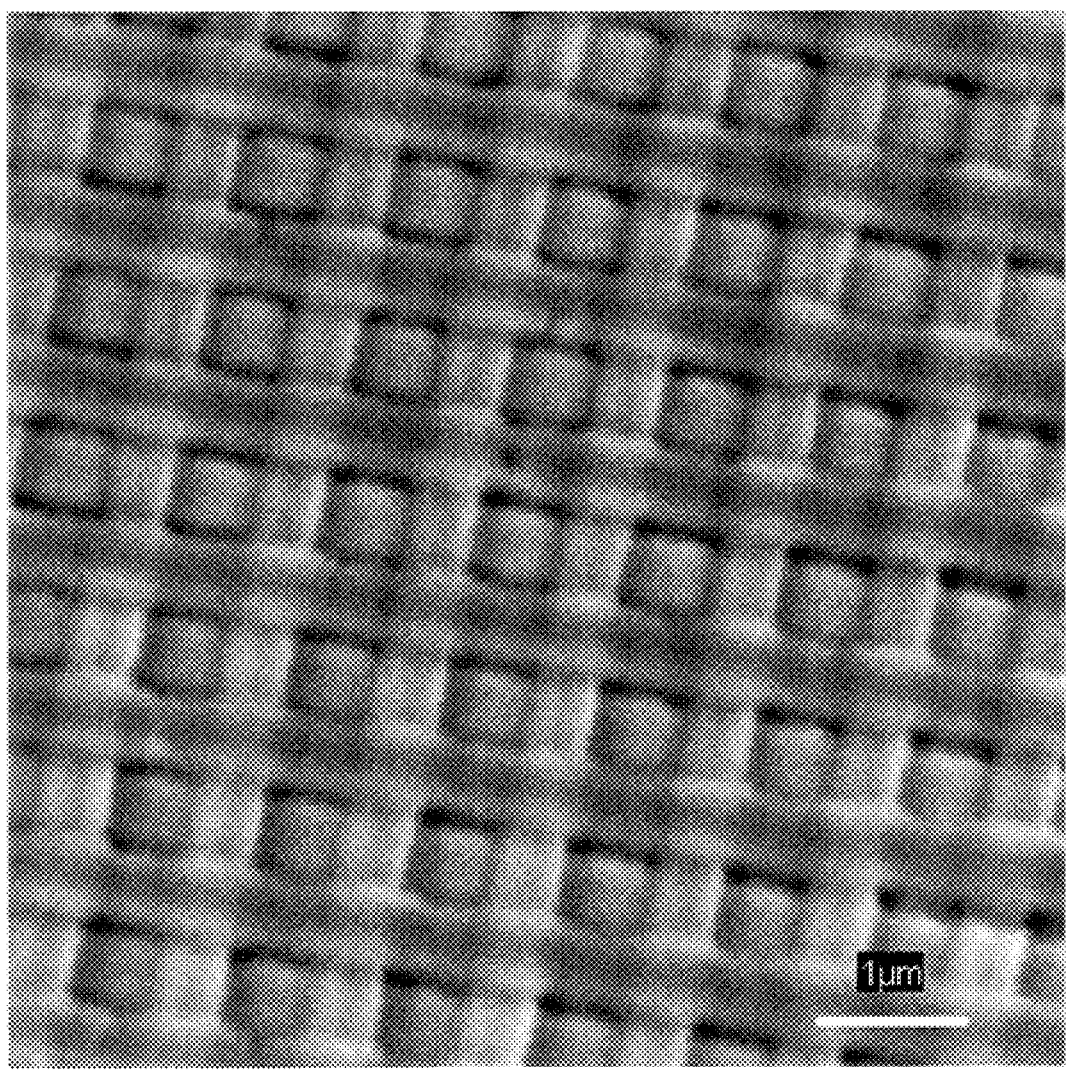
FIG. 16 is an image of a four layer ceramic photonic structure having a 1 $\mu$m periodicity made from a four layer epoxy mold.

FIG. 15 shows a two layer ceramic photonic band gap structure having 1 $\mu$m periodicity made by infiltrating the mold of FIGS. 14a and 14b with a ceramic slurry or ceramic pre-sol and heating the mold until the epoxy decomposes. FIG. 16 shows a four layer ceramic photonic band gap structure having 1 $\mu$m periodicity made by infiltrating a four layer epoxy mold with a ceramic slurry or ceramic pre-sol and heating the mold until the epoxy decomposes.

A method of manufacturing photonic band gap structures has been described. The presence of a forbidden frequency gap in the photonic band gap structure can be used to severely modify the lifetimes of excited chemical species situated within the material. The decay rate of an excited atom or molecule is proportional to the density of photon states available for the transition when a photon is emitted in the transition process. By immersing the excited atom/molecule in a photonic band gap material, one can increase or decrease the density of photon states available for the transition, and hence, enhance or suppress the decay rate of the excited species. The capability of selectively modifying the lifetimes of excited transient species will be very useful in photocatalytic processes to increase the yield or selectivity of catalyzed reactions.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method to manufacture a photonic band gap structure having a multi-layer structure, the multi-layer structure having a number of dielectric rods to form a plurality of planar layers, the plurality of planar layers one on the other to form a multi-dimensional structure, each planar layer having a plurality of dielectric rods arranged with parallel axes at a given spacing, each planar layer having its axes oriented at an approximately ninety degree angle with respect to adjacent planar layers, the method comprising:
   a) filling a plurality of grooves of an elastomeric mold with a polymer that can be decomposed via pyrolysis, each groove in the plurality of grooves in parallel with each other;
   b) curing the polymer to form a polymer layer of polymer rods;
   c) stamping the polymer layer by making contact with one of a substrate or a multi-layer polymer structure;
   d) forming the multi-layer polymer structure by repeating steps a to c until a desired number of polymer layers have been formed, the multi-layer polymer structure having channels;
   e) introducing a ceramic bearing material into the channels to form a ceramic and polymer structure; and
   f) heating the ceramic and polymer structure to decompose the polymer structure to create the multi-layer structure.

2. The method of claim 1 further comprising the steps of
   creating a patterned template having notches at a predetermined spacing; and
   fabricating the elastomeric mold by pouring an elastomer on the patterned template;
   curing the elastomer; and
   peeling the elastomer off of the patterned template to form the elastomeric mold, the elastomeric mold having a plurality of grooves located at a location corresponding to the notch locations.

3. The method of claim 2 wherein the elastomer is poly-dimethylsiloxane.

4. The method of claim 2 wherein the each notch has a dimension, the step of creating a patterned template having notches includes the step of selecting the predetermined spacing and the dimension such that the multi-layer structure has a photonic band gap at a given wavelength.

5. The method of claim 1 wherein the ceramic bearing material is one of a ceramic slurry or a pre-ceramic sol.

6. The method of claim 1 wherein the polymer rods in a polymer layer are in parallel with each other and wherein the step of forming the multi-layer polymer structure includes the steps of
   stamping an initial polymer layer on the substrate;
   stamping a plurality of polymer layers on the initial polymer layer until a predetermined number of polymer layers are stacked on the initial polymer layer; each layer of the plurality of polymer layers stamped at a location such that the polymer rods of each layer are at an approximately ninety degree angle to the polymer rods of an adjacent layer of the plurality of polymer layers and such that polymer rods of alternate layers are substantially in parallel and offset to each other.

7. The method of claim 6 wherein the polymer rods in a polymer layer are spaced apart by a predetermined distance and the offset is approximately one half of the predetermined distance.

8. The method of claim 1 further comprising the step of aligning the polymer layers of the multi-layer polymer structure.

9. The method of claim 8 wherein the step of aligning the polymer layers of the multi-layer polymer structure comprises the steps of:
   pointing a laser at an initial layer and a second layer stacked on the initial layer at an approximately ninety degree angle to initial layer;
   determining if a resulting diffraction pattern is a pattern of spots in a square grid;
   if the resulting diffraction pattern is not a pattern of spots in a square grid, rotating the second layer until the pattern of spots is in a square grid;
   for subsequent layers of the multi-layer polymer structure:
   shining a light through the multi-layer polymer structure; and
   rotating the subsequent layers of the multi-layer polymer structure until a light intensity of a resulting light pattern is minimized.

10. A method to align layers of a multi-layer photonic band gap structure, the layers comprising a plurality of pairs of layers comprising a first layer and a second layer, the method comprising the steps of:
   for each pair of layers:
   pointing a laser at a first layer and a second layer stacked on the first layer at an approximately ninety degree angle to the first layer;
   determining if a resulting diffraction pattern is a pattern of spots in a square grid;
   rotating the second layer until the pattern of spots is in a square grid if the resulting diffraction pattern is not a pattern of spots in a square grid; and
   aligning the pairs of layers.

11. The method of claim 10 wherein the step of aligning pairs of layers comprises:
   shining a light through the pairs of layers;
   rotating at least one of the pairs of layers of the multi-layer polymer structure until a light intensity of a resulting light pattern is minimized.

12. The method of claim 11 further comprising the step of aligning the plurality of pairs of layers such that alternate layers are substantially in parallel and offset to each other.

13. A method to manufacture a photonic band gap structure having a multi-layer structure, the multi-layer structure having a number of dielectric rods to form a plurality of planar layers, the plurality of planar layers one on the other to form a multi-dimensional structure, each planar layer having a plurality of dielectric rods arranged with parallel axes at a given spacing, each planar layer having its axes oriented at an approximately ninety degree angle with respect to adjacent planar layers, the method comprising the steps of:

a) filling a plurality of grooves of an elastomeric mold with a polymer that can be decomposed via pyrolysis, each groove in the plurality of grooves in parallel with each other;

b) curing the polymer to form a polymer layer of polymer rods;

c) stamping the polymer layer by making contact with one of a substrate or a multi-layer polymer structure;

d) forming the multi-layer polymer structure by repeating steps a to c until a desired number of polymer layers have been formed, the multi-layer polymer structure having channels, the polymer layers forming a plurality of pairs of layers including a first pair of layers comprising a first layer and a second layer;

e) for the first pair of layers:
pointing a laser at the first layer and the second layer stacked on the first layer at an approximately ninety degree angle to the first layer;
determining if a resulting diffraction pattern is a pattern of spots in a square grid;
rotating the second layer until the pattern of spots is in a square grid if the resulting diffraction pattern is not a pattern of spots in a square grid;

f) aligning the plurality of pairs of layers;

g) introducing a ceramic bearing material into the channels to form a ceramic and polymer structure; and h) heating the ceramic and polymer structure to decompose the polymer structure to create the multi-layer structure.

14. The method of claim 12 wherein the step of aligning the plurality of pairs includes:
for subsequent layers of the multi-layer polymer structure:
shining a light through the multi-layer polymer structure; and
rotating the subsequent layers of the multi-layer polymer structure until a light intensity of a resulting light pattern is minimized.

15. The method of claim 12 wherein the step of aligning the plurality of pairs includes aligning the plurality of pairs of layers such that alternate layers are substantially in parallel and offset to each other.

16. The method of claim 12 wherein the plurality of grooves forms a plurality of channels in the elastomeric mold, each channel having a first end and a second end opposite the first end, the step of filling the plurality of grooves of the elastomeric mold comprises the steps of:

placing a chamber over the elastomeric mold such that the first end of each of the plurality of channels is covered by the chamber and the second end of each of the plurality of channels is open, the chamber having an opening at one of a top of the chamber and a side of the chamber;

injecting the polymer into one of the second end of each channel and the opening; and initiating the curing of the polymer after a portion of the polymer flows through the other of the second end of each channel and the opening.

17. The method of claim 16 further comprising the step of decreasing a pressure at the other of the second end of each channel and the opening to draw the polymer into the plurality of channels.

18. The method of claim 17 wherein the polymer is injected into the second end of each channel and wherein the step of decreasing the pressure at the other of the second end of each channel and the opening includes inserting a syringe over the opening and drawing air out of the plurality of channels.

* * * * *